United States Patent
Botsford et al.

(10) Patent No.: US 9,888,052 B2
(45) Date of Patent: Feb. 6, 2018

(54) ABR ALLOCATION FOR STATISTICAL MULTIPLEXING

(71) Applicant: IMAGINE COMMUNICATIONS CORP., Frisco, TX (US)

(72) Inventors: Nelson Botsford, Punta Gorda, FL (US); Robert L. Schmidt, Howell, NJ (US)

(73) Assignee: Imagine Communications Corp., Frisco, TX (US)

( * ) Notice: Subject to any disclaimer, the term of this patent is extended or adjusted under 35 U.S.C. 154(b) by 241 days.

(21) Appl. No.: 14/860,019

(22) Filed: Sep. 21, 2015

(65) Prior Publication Data

US 2017/0085616 A1 Mar. 23, 2017

(51) Int. Cl.
*G06F 15/16* (2006.01)
*H04L 29/06* (2006.01)
*H04L 29/08* (2006.01)

(52) U.S. Cl.
CPC ........ *H04L 65/607* (2013.01); *H04L 65/4076* (2013.01); *H04L 65/4084* (2013.01);
(Continued)

(58) Field of Classification Search
CPC .............. H04L 65/607; H04L 65/4076; H04L 65/4084; H04L 65/602; H04L 65/80; H04L 67/02
See application file for complete search history.

(56) References Cited

U.S. PATENT DOCUMENTS

| 5,506,844 A | 4/1996 | Rao |
| 5,708,664 A | 1/1998 | Budge et al. |

(Continued)

FOREIGN PATENT DOCUMENTS

| CN | 1460378 | 12/2003 |
| CN | 101252689 | 8/2008 |
| KR | 10-2014-0069256 | 6/2014 |

OTHER PUBLICATIONS

International Search Report and Written Opinion, PCT Application No. PCT/US2016/052505, Filed Sep. 19, 2016, dated Jan. 3, 2017; Authorized Officer Jin Ick Lee; 14 pgs.
(Continued)

*Primary Examiner* — Richard G Keehn
(74) *Attorney, Agent, or Firm* — Tarolli, Sundheim, Covell & Tummino LLP

(57) ABSTRACT

As one example, a method includes analyzing profile metadata for each of a plurality of ABR program streams within a lookahead window from a current chunk boundary to identify at least one target event at a chunk boundary. ABR profiles for chunks at the target event chunk boundary are allocated to fit within the channel bandwidth and achieve a predetermined target quality level for the chunks at the target event chunk boundary. In response to each target event, ABR profiles for each of the unallocated chunks within the lookahead window are selected by adjusting the ABR profiles for each of the unallocated chunks to fit within the predetermined bandwidth constrained by the ABR profiles allocated for the chunks at the target event chunk boundary. An ABR profile for a given chunk at the current chunk boundary is allocated based on the selected ABR profiles.

20 Claims, 5 Drawing Sheets

(52) U.S. Cl.
CPC ............ *H04L 65/602* (2013.01); *H04L 65/80* (2013.01); *H04L 67/02* (2013.01)

(56) References Cited

U.S. PATENT DOCUMENTS

| | | | |
|---|---|---|---|
| 6,023,725 | A | 2/2000 | Ozawa et al. |
| 6,738,428 | B1 | 5/2004 | Zetts |
| 6,931,059 | B1 | 8/2005 | Van Dusen et al. |
| 6,996,129 | B2 | 2/2006 | Krause et al. |
| 7,028,096 | B1 | 4/2006 | Lee |
| 7,046,677 | B2 | 5/2006 | Monta et al. |
| 7,804,856 | B2 | 9/2010 | Krause et al. |
| 7,991,904 | B2 | 8/2011 | Melnyk et al. |
| 8,107,524 | B2 | 1/2012 | Laksono |
| 2002/0140851 | A1 | 10/2002 | Laksono |
| 2002/0152317 | A1 | 10/2002 | Wang et al. |
| 2006/0140202 | A1* | 6/2006 | Garg ...................... H04L 49/90 370/412 |
| 2006/0193380 | A1 | 8/2006 | Laksono |
| 2006/0224762 | A1 | 10/2006 | Tian et al. |
| 2008/0052414 | A1 | 2/2008 | Panigrahi et al. |
| 2008/0098124 | A1 | 4/2008 | Vaughan et al. |
| 2008/0133561 | A1* | 6/2008 | Dubnicki ............. G06F 11/1453 |
| 2010/0189183 | A1 | 7/2010 | Gu et al. |
| 2010/0299552 | A1 | 11/2010 | Schlack et al. |
| 2011/0167170 | A1 | 7/2011 | Kovvali et al. |
| 2011/0246659 | A1 | 10/2011 | Bouazizi |
| 2012/0324123 | A1 | 12/2012 | Fox et al. |
| 2013/0179589 | A1* | 7/2013 | McCarthy .......... H04N 21/8456 709/231 |
| 2013/0179590 | A1* | 7/2013 | McCarthy .......... H04N 21/8456 709/231 |
| 2013/0298170 | A1 | 11/2013 | Elarabawy et al. |
| 2014/0025835 | A1 | 1/2014 | Gahm et al. |
| 2015/0215359 | A1* | 7/2015 | Bao ....................... H04L 65/605 709/219 |
| 2016/0072716 | A1* | 3/2016 | Chow ................. H04L 47/2475 709/219 |
| 2016/0080237 | A1* | 3/2016 | Halepovic .......... H04L 43/0894 709/224 |

OTHER PUBLICATIONS

Pantos & May, 'HTTP Live Streaming', Nov. 19, 2010, 23 pages [retrieved on Jan. 18, 2011]. Retrieved from the Internet: <URL: http://tools.ietf.org/html/draft-pantos-http-live-streaming-05>.

Smooth Streaming, Microsoft Corporation IIS web site, date unknown, 3 pages, [retrieved on Jan. 20, 2011]. Retrieved from the Internet: <URL: http://www.iis.net/download/SmoothStreaming>.

Statistical Multiplexing—Multiplex Usage Chart, author unknown, date unknown, 4 pages, [retrieved on Jan. 18, 2011]. Retrieved from the Internet: <URL: http://igorfuna.com/dvb-t/slovenia/multiplex-a-usae-chart>.

Changuel, N., et al., 'Predictive Control for Efficient Statistical Multiplexing of Digital Video Programs', date unknown, 9 pages, [retrieved on Jan. 18, 2011]. Retrieved from the Internet: <URL: http://reseasrch.microsoft.com/en-us/um/redmond/events/pv2009/papers/session_congestion_control/paper%2036.pdf>.

* cited by examiner

ABR ALLOCATION FOR STATISTICAL MULTIPLEXING

TECHNICAL FIELD

This disclosure relates generally to ABR allocation for statistical multiplexing.

BACKGROUND

Two general approaches can be used to combine digital services into a multiplex. In one case, services are encoded at a constant bit rate, such that each of the services uses a fixed amount of the capacity of the broadcast multiplex. Another approach is to encode the service using a variable bit rate to take advantage of the time varying statistics of the service, and dynamically share the aggregate capacity among the different services. This method, known as statistical multiplexing, can allocate increased bitrate to services when there is a need and decrease the bitrate on others to provide better quality of service across all services. As a result statistical multiplexing can provide a link utilization improvement sometimes referred to as the statistical multiplexing gain.

SUMMARY

This disclosure relates generally to ABR profile allocation for statistical multiplexing.

As one example, a method includes determining a target adaptive bitrate (ABR) profile for each of a plurality of program streams to be transmitted on an output channel to achieve a substantially equalized target quality for the program streams to fit within a bandwidth of the output channel. The method also includes identifying changes at each chunk boundary within a lookahead window that is determined to cause a predefined bandwidth condition for the output channel. The lookahead window extends an interval from a current chunk boundary corresponding to a chunk that is to be allocated at the current chunk boundary. The method also includes modifying a level of the target ABR profile for one or more given chunks of at least one of the program streams to resolve the bandwidth condition with a smallest relative decrease in quality or largest relative increase in quality relative to a target quality for each given chunk. The method also includes selecting an ABR profile for the chunk that is to be allocated at the current chunk boundary based on the modifying and not exceed the bandwidth of the output channel.

As another example, a system includes a chunk allocator that allocates adaptive bitrate (ABR) profiles for reading a plurality of program streams that are multiplexed into an output channel having a channel bandwidth. The chunk allocator includes a lookahead window analyzer that analyzes profile metadata for each of the program streams within a lookahead window from a current chunk boundary to identify at least one target event at a chunk boundary within the lookahead window. The chunk allocator also includes a profile resolver that, in response to each target event, allocates ABR profiles for chunks at the target event chunk boundary to fit within the channel bandwidth and achieve a substantially optimal quality level. The profile resolver further allocates the ABR profiles for each of the unallocated chunks within the lookahead window by adjusting the ABR profiles for each of the unallocated chunks to fit within the predetermined bandwidth constrained by the ABR profiles allocated for the chunks at the target event chunk boundary. The chunk allocator selects an ABR profile for a given chunk that is to be allocated at the current chunk boundary based on the adjusting.

As yet another example, a method includes analyzing profile metadata for each of a plurality of ABR program streams within a lookahead window from a current chunk boundary to identify at least one target event at a chunk boundary. ABR profiles for chunks at the target event chunk boundary are allocated to fit within the channel bandwidth and achieve a substantially optimal quality level for the chunks at the target event chunk boundary. In response to each target event, ABR profiles for each of the unallocated chunks within the lookahead window are selected by adjusting the ABR profiles for each of the unallocated chunks to fit within the predetermined bandwidth constrained by the ABR profiles allocated for the chunks at the target event chunk boundary. An ABR profile for a given chunk at the current chunk boundary is allocated based on the adjusting.

DETAILED DESCRIPTION

Figure 1:
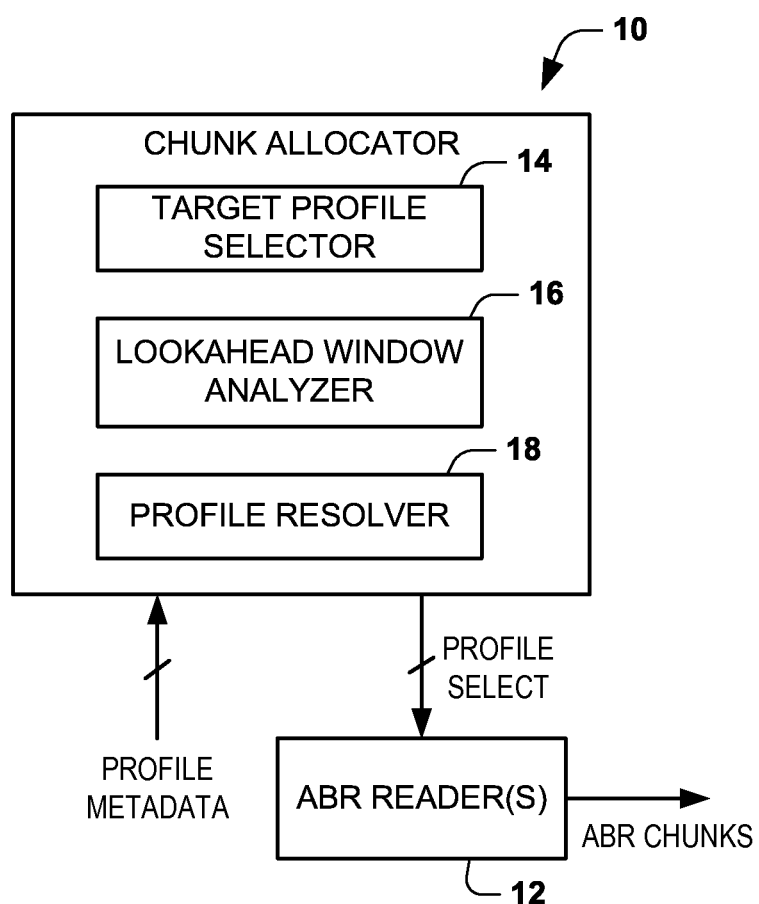
FIG. 1 is an example of a chunk allocator for selecting ABR profiles for use in a broadcast multiplex.

This disclosure relates to adaptive bitrate (ABR) allocation that can be utilized for statistical multiplexing. According to systems and methods disclosed herein, each chunk of media content (e.g., audio, video and/or other data) that is provided in an ABR stream can be assigned a target quality that is utilized to assign an initial profile selection for chunks that are later combined into a single multiplex, which includes multiple streams. However, because chunk boundaries across different program streams do not always begin and end on specific synchronized chunk boundaries, changes in one or more ABR profiles can result in non-optimal profile assignments, which can cause underflow or overflow in downstream decoder buffers. Accordingly, systems and methods disclosed herein employ a chunk allocator configured to lookahead and identify chunk boundaries for the start of new chunks that would result in a non-optimal bandwidth condition using the current target profiles.

Since one or more program streams in the multiplex can have a plurality of available ABR profiles and each profile has a corresponding quality and associated bitrate, the allocator can determine the impact on the actual quality if the profile for a respective program is incrementally reduced to the next lower level. The allocator further can ascertain the decrease in bitrate and whether the decrease is sufficient to remedy the identified non-optimal bandwidth condition. For example, the chunk allocator can modify (e.g., reduce) the profile level of a selected one of the streams that is determined to have a smallest reduction in quality and sufficient reduction in bitrate to rectify the aggregate bandwidth for the multiplex.

In addition to reducing the program level for one program stream, as just mentioned, the chunk allocator can also identify one or more other program streams in the multiplex that can be incrementally increased and still fit within the channel bandwidth. For example, the allocator can increment the profile level according to which program stream or program streams will result the largest quality improvement with respect to the originally assigned target quality and still keep the multiplex within the aggregate channel bandwidth.

As a further example, certain events (e.g., scene changes) can correspond to dramatic increases in complexity from one chunk to the next. Accordingly, the chunk allocator can look ahead within a lookahead window to identify events associated with boundary conditions resulting in a change of complexity between sequential chunks in a given stream that exceed a predetermined complexity threshold. The chunk allocator can lock-in the profile at the identified target quality for one or more future events determined to be most important (e.g., severe). The chuck allocator can, in turn, adjust the profile of chunks in one or more other program streams leading up to or overlapping with the event, such as by temporarily reducing such chunks to a lower profile level to ensure that the quality of the chunk corresponding to the most important event or events remains at or near the target quality that was locked in.

The systems and methods disclosed herein can improve operation of traditional multiplexing systems. Traditional statistical multiplex systems, for example, provide feedback from the multiplexer to the associated encoders that causes them to dynamically change their rate. However, if the same services need to be used in different multiplexes (e.g., because of different channel line-ups or ad placements) this traditional approach may fail. Instead each encoder can generate several different ABR profiles at fixed bitrates, then the multiplexer can choose which profile to use at chunk boundaries for each program. This allows a single encoder to feed many different statistically multiplexed transmissions.

FIG. 1 depicts an example of a chunk allocator 10 configured to select profiles for allocating chunks of data to be streamed out. As used herein, the term "chunk" refers to a discrete encoded section of data that can be independently decoded. For example, each chunk of ABR media content can be stored in non-transitory memory structure as a separate file. In the context of streaming media, a given chunk of content is often referred to as a segment or fragment depending on which ABR technology is being implemented. The chunks of data can include video, audio and/or other forms of data, which can depend on application requirements. Examples of ABR video technologies that can be utilized to generate profiles for media content can include hypertext transfer protocol (HTTP) Live Streaming (HLS), HTTP Smooth Streaming (HSS-1 or HSS-2), HTTP Dynamic Streaming (HDS), Dynamic Adaptive Streaming over HTTP (DASH) as well as other ABR delivery formats.

In the example of FIG. 1, the chunk allocator 10 provides a profile select signal to control one or more ABR readers for reading ABR chunks for each program stream that is aggregated together and provided in a multiplex for downstream transmission. Each ABR reader 12 can access and read ABR chunks from an associated source (or from multiple sources) according to a selected profile. The profiles for each program can be specified in a corresponding manifest file that has been generated for each respective program. For example, the ABR reader 12 can access an ABR chunk from a content source, such as a content delivery network or other service, and provide each of the ABR chunks to an output for streaming the chunks for the respective program based upon the profile selected by the chunk allocator 10. In some examples, the ABR reader 12 can provide ABR chunks for a given program stream to include more than one type of program, such as can include a main program, an auxiliary program, such as ads or the like, one or more audio streams and associated metadata.

As described herein, the output channel, in which each of a plurality of ABR streams are provided as a multiplex, has a maximum aggregate bitrate in which each of the program streams are provided. The maximum aggregate bitrate can be fixed or it can vary over time, but is known. The chunk allocator 10 thus analyzes the profile metadata across the program streams in the multiplex and, for each ABR chunk that is to be provided, selects which profile to use for each respective stream. The chunk allocator 10 generally operates to select ABR chunks across the program streams that provide the best overall picture quality within the available bandwidth of the output channel. The profile metadata thus can specify a start time, duration, size (e.g., bytes), bitrate and quality for each available ABR profile that is available for allocating chunks in a set of program streams. As described herein, there can be any number of one or more such program streams in the output channel. For purposes of the following discussion, a given output channel it is presumed that more than one program stream is provided in the multiplex according to the output channel.

The chunk allocator 10 includes a target profile selector 14 configured to select a target ABR profile for each program stream of the output channel. The target profile selector selects each profile to achieve a target quality for each respective program stream in the output channel. Each available profile for a given program stream has an associated bitrate, which is also identified in the profile metadata. Accordingly, the target profile selector 14 substantially equalizes the respective quality across the program streams, constrained by the associated bitrates of available chunks for each program stream, to fit within the predetermined bandwidth of the output channel. Thus, by substantially equalizing the quality across the program streams in the multiplex, the available bandwidth is allocated such that complex chunks get a larger share and more simple chunks get a smaller share, which results in increasing overall efficiency.

As used herein, the term "substantially" is intended to indicate that while a goal of the target quality level is to achieve equalized quality across program streams or in some cases optimal quality level (e.g., at chunk boundaries), each of the program streams may be encoded to a plurality of profiles having different bitrates and different quality levels. In view of the different quality levels associated with the different profiles for each program stream there likely is to be some variation, which in some cases may be significant.

The target profile selector 14 is configured to determine an initial target quality and associated profiles for each program stream. As disclosed herein, the target quality and associated profiles can be determined according to various approaches.

As one example of finding the initial target quality for program streams, the target profile selector 14 can employ a complexity calculator to determine a rate allocation of each program stream ($R_N$, where N denotes the program number) with respect to the aggregate rate of the multiplex based on the ratio of each average complexity ($C_{Navg}$) to the total complexity ($C_{total}$), such as follows:

$$C_{total} = \sum C_{Navg} \text{ For all channels.}$$

$$R_N = \frac{C_{Navg}}{C_{total}}$$

where $C_{Navg}$ across all rates for each channel can be represented as follows:

$$C_{Navg} = \frac{1}{n}\sum C_{Nn}$$

where n=number of available profiles per program stream; and

N=program stream number.

Given each program stream's rate allocation, the target profile selector 14 can find the target profile for each N program streams that comes closest to the rate allocation bandwidth $R_N$, based on the bitrates for the available profiles for each program stream, without exceeding $R_N$. To achieve substantially optimal profile allocation for the multiplex, the chunk allocator 10 can employ a profile resolver 18 to implement additional analysis and adjustments. The profile resolver can save the amount of rate remainder between the largest possible rate profile value and the determined substantially optimum allocation. Once this is done for each channel, there will be additional bandwidth left equal to the sum of all of the channel remainders, that can be expressed as follows.

$$R_{Ninit} = R_N(n) \text{ Where } (R_N(n) \le R_N)$$

$$R_{rem} = R_{total} - \Sigma R_{Ninit}$$

To optimize the utilization of the remaining rate $R_{rem}$, the profile resolver 18 determines the amount of additional rate needed for each channel to increment to its next higher rate. Starting with the channel that had the largest remainder, for example, the profile resolver 18 determines if the channel's profile can be incremented by one and fit in the remaining bandwidth. The profile resolver 18 can thus process for the channels in the multiplex until the remaining bandwidth is minimized, such as can be expressed as follows:

$$R_{Nrem} = R_N - R_N(n)$$

$$R_{Nd} = R_N(n+1) - R_N(n)$$

while $(R_{rem} + \Sigma R_{Ninit} \le R_{total})$ find largest $R_{Nrem}$ and increment to next rate profile.

Table 1 demonstrates another example of a profile selection algorithm that can be implemented by the chunk allocator 10 for the case when the chunks are aligned equal-length CBR chunks. In this example, to implement the profile selection algorithm, the chunk allocator 10 employs the profile selector 14 and profile resolver 18 to implement for the set of streams in the multiplex. In this example, the target profile selector 14 thus can determine initial target rates to achieve a desired equalized quality that is nearest a target quality level. The profile resolver 18 can then evaluate the channel rate for the multiplex relative to the sum of rates for the channels and increase rate profiles for channels based on the evaluation.

TABLE 1

PROFILE SELECTION

1. For Q in 1 to 100 (or other range) compute:
$R_Q = \Sigma_{Channels}$ Rate_of_Profile_with_Nearest_Quality_to_Q and associate the selected profiles as $P_c(Q)$
2. Target profile selector 14 can find Q such that $R_Q$ is as close as possible to the channel bandwidth without going over.
3. If Channel_Rate - $R_Q$ is significant, refine the selection as follows:
   i.                     For each channel check if the next highest rate TABLE 1-continued

PROFILE SELECTION profile will fit in the channel bandwidth. If more than one can be increased:
   ii.                    For each channel that can be increased, select the one that would result in the largest increase in quality and update $P_c(Q)$.
   iii.                  Then repeat step 3
4. Pass $P_c(Q)$ to the ABR reader (e.g., ABR reader 152 of FIG. 4).

Table 2 below demonstrates an example of three different program streams (A, B and C) each encoded to five different ABR profiles with average bit rates associated with each profile. As shown in the example of Table 2, by applying the example chunk profile selection algorithm in Table 1, the equalized quality to fit in a channel bandwidth of 12 could be set to Quality_A=49, Quality_B=51 and Quality_C=57, associated with profiles 2, 3, and 5, respectively.

TABLE 2

|  | Avg Rate | Stream A | Stream B | Stream C |
| --- | --- | --- | --- | --- |
| profile 1 | 8 | 70 | 80 | 90 |
| profile 2 | 6 | 49 | 64 | 81 |
| profile 3 | 4 | 34 | 51 | 72 |
| profile 4 | 3 | 23 | 40 | 64 |
| profile 5 | 2 | 16 | 32 | 57 |

By way of further example, the target profile selector 14 is configured to specify a target profile for each boundary condition corresponding to the start of a new chunk. The target profiles can be selected from the set of available bitrates, based on profile metadata, to provide equalized quality level across the program streams in the multiplex, such as mentioned above. Since the encoded ABR chunks for each of the program streams generally will not be aligned or have equal length segments and since the bitrate for sequential chunks in a given program stream is variable, the chunk allocator 10 may include a lookahead window analyzer 16 to detect changes at boundary conditions that might cause non-optimal bandwidth conditions for the output channel if each of the specified target profiles were utilized.

As another example of finding the target quality, the target profile selector 14 can determine the target quality and associated initial profiles based on analyzing quality metadata and bitrates of chunks to be transmitted concurrently in the multiplex. For instance, a target bitrate at a chunk boundary can be computed by first identifying the chunk in each of the other programs in the multiplex that are to be transmitted concurrently (or have a chunk boundary at the same time). Next, for each possible target quality level, the target profile selector 14 finds the ABR profile that has the closest quality metadata value for each program in the multiplex and sum the individual bitrates of the profiles selected. The target quality level for that boundary is the highest quality level that does not result in a bandwidth overflow if the associated ABR profiles are each selected. This target quality is then assigned to any chunk(s) that start at that boundary, and the initial profile for such chunk(s) can be set accordingly.

In some cases, the target quality and associated target profiles chosen result in an under or over utilization of bandwidth. The lookahead window analyzer 16 is configured to identify each program stream in the output channel that exhibits a change in bitrate associated with one or more chunk boundaries within a lookahead window having a prescribed duration from the current time (e.g., the beginning chunk boundary of the next chunk to be allocated). The lookahead window can be set to a duration that is an integer multiple of an average or maximum chunk length among the program streams. For example, the lookahead window duration can be set to about twice the average chunk length or to another fixed or user programmable duration. Other intervals may also be used. In some examples, the lookahead window can keep a fixed duration. In other examples, the lookahead window may vary and be reset for allocating each chunk boundary, such as to ensure that window has a duration sufficient to contain a minimum number of chunks and/or chunk boundaries (e.g., two or more) for each program stream. The lookahead window analyzer 16 can evaluate the bitrate of each program stream within the lookahead window to determine if a change in bitrate at a given chunk boundary will cause the aggregate bitrate of program streams to exceed the maximum channel bandwidth. By way of example, the lookahead window analyzer 16 can be configured to identify each chunk boundary from the start time that causes a bandwidth overflow for the output channel.

The profile resolver 18 is configured to analyze the available profiles for each program stream and determine a level of one or more of the selected profiles that can be modified to a reduced level (e.g., having a reduced quality level and a corresponding reduced bitrate) that would resolve the overflow bandwidth condition detected by the lookahead window analyzer 16. The profile resolver 18 can make this determination according to which of the available ABR profiles for the identified streams will provide the smallest relative decrease in actual quality relative to the target profile that was specified by the target profile selector 14 yet sufficient to remedy the identified bandwidth condition. The profile resolver 18 thus can compute a corresponding decrease in bitrate and a decrease in quality that would result from selecting an incrementally reduced ABR profile level for each chunk within the lookahead window. Based on a comparison of the relative decrease in quality among the chunks within the lookahead window that sufficient to reduce the aggregate bitrate of program streams in the multiplex as to no longer exceed the maximum channel bandwidth.

After decreasing a profile level for one of the streams, it is possible that another of the program streams could be modified to an increased profile level (e.g., having a higher quality and higher bitrate) without causing a corresponding overflow in the output channel bandwidth. Accordingly, the profile resolver 18 can further analyze the available profile for each program stream and identify a next highest rate profile for one or more other program stream that will increase quality for such stream without exceeding the channel bandwidth. That is, the profile resolver 18 can be configured to select the one or more program streams that can be increased to the next highest profile level to afford the highest increase in quality without causing overflow. After one or more levels of ABR profiles for the program streams identified by the analyzer 16 have been adjusted, the chunk allocator 10 can provide the selected profiles to the ABR reader 12 for providing the respective ABR chunks downstream for further processing (e.g., modulation and multiplexing into the corresponding output channel).

In addition to adjusting the profile levels according to quality to fit within the aggregate channel bandwidth (e.g., mitigate over and underflow), the chunk allocator 10, in some examples, is configured to lock in or fix the quality level for a given chunk exhibiting a dramatic change in picture complexity from its preceding chunk. For example, the lookahead window analyzer 16 can also identify changes between picture quality between sequential chunks in a given program stream that exceed a predetermined complexity threshold for each chunk boundary condition within a lookahead window. The lookahead window used for analyzing chunk complexity can be the same (e.g., two average chunk lengths) or different as used for quality and bitrate analysis. As an example, the increase in complexity at a chunk boundary can correspond to a scene change or other detected event (e.g., specified in or determined from profile metadata) where it is explicitly desired to maintain the target quality level, even at the expense of temporarily decreasing the quality of one or more other program streams.

By way of example, the program resolver 18 can be programmed to lock in the profile level for a chunk within the lookahead window and, constrained by the bitrate associated with the fixed or locked-in chunk, modify the profile level of one or more of the remaining program streams within the lookahead window. The modifications to the remaining streams within the lookahead windows can include both decreasing the level of a program stream to fit within the channel bandwidth and, if appropriate, increasing the profile level of one or more other of the program streams so that with the locked-in profile for the upcoming "important" chunk. The profile resolver 18 can adjust the profile of each of the other program streams within the lookahead window to allocate chunks to be closest to the desired target quality and still fit within the overall channel bandwidth, as mentioned above. Since the lookahead window is constantly moving from the current time as new chunks are being allocated, the chunk allocator 10 can allocate one new chunk at the next chunk boundary based upon the resolved profiles within the lookahead window based on complexity and/or quality considerations, as disclosed herein. The chunk allocation process is then repeated for the new set of chunks (e.g., based on analyzing bitrate, quality and complexity) for each upcoming next chunk boundary within the lookahead window.

Figure 2:
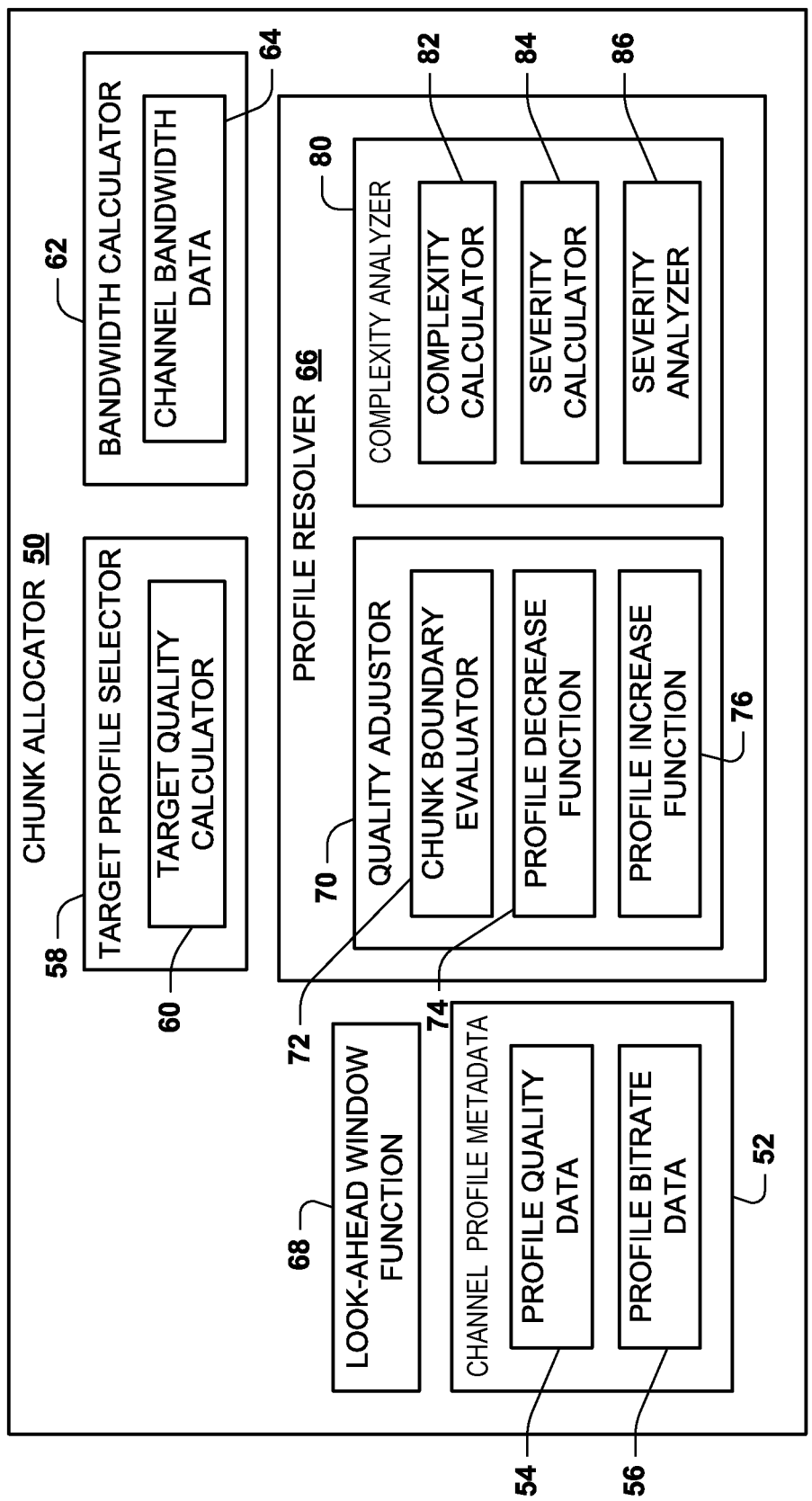
FIG. 2 is a block diagram depicting an example of a chunk allocator.

FIG. 2 depicts another example of a chunk allocator 50 to select chunk profiles for one or more program streams provided in a multiplex of program streams, corresponding to an output channel having a predetermined channel bandwidth. As used herein, a given program can refer to one or more transport streams that include one or more audio and video elementary streams, which can collectively be played out for presentation of the corresponding media content encoded thereby.

The chunk allocator 50 employs channel profile metadata 52 that is provided for each program stream in the corresponding output channel. For example, the chunk allocator 50 can receive the profile metadata for each of the respective programs from an ABR reader that reads all available profiles and computes the metadata, or directly from an ABR server that provides the chunks of the ABR data for each of the respective program streams. As disclosed herein, the output channel can correspond to a multiplex of streams for each of the programs contained therein. The channel profile metadata 52 thus can include corresponding profile quality data 54 and profile bitrate data 56 for each of the program streams in the multiplex to provide the output channel. The profile quality data 54 and profile bitrate data 56 thus can be provided for each of the available chunks of each program stream according to the ABR parameters utilized to encode the chunks for each profile. Other channel profile metadata 52 can include duration of a given chunk that is to be displayed, size (e.g., number of byes) of the given chunk, time stamp information, encoding parameters and the like to facilitate decoding and downstream presentation of the program stream. The chunk allocator 50 operates to assign an ABR profile for each new chunk that is to be read at a given chunk boundary to provide a sequence of chunks over time that define a corresponding program stream. Each program stream can be a variable bitrate stream or a fixed bitrate stream according to application requirements.

The chunk allocator 50 includes a target profile selector 58 configured to determine a target profile for each of the program streams in the corresponding output channel. The target profile selector can operate to equalize the quality level across the programs in the corresponding output channel in which the programs are multiplexed. For example, the target profile selector 58 can employ a target quality calculator 60 to compute the target quality for each of the individual program streams and to select target profiles based on quality. The quality may be specified in the profile quality data 54 of the profile metadata for each of the respective program streams. As an example, the profile quality data 54 may be sent to the chunk allocator encapsulated on a separate program identifier (PID), such as can be sent through an ABR chunk generator as either a data service or an additional profile.

By way of example, visual quality of a given chunk of video can be determined according to one or more quality metrics. Example of a quality metric are signal-to-noise ratio (SNR) and peak signal-to-noise ratio (PSNR), which may be calculated between an original video signal and signal passed through a system. Another indication is the average macroblock quantization (Mquant) value, which can be utilized in conjunction with complexity information to provide an indication of visual quality. For instance, source media with a high complexity can typically tolerate a worse Mquant value and likewise material with a low complexity will typically require a better Mquant value to afford the same visual quality. Other video quality metrics can be utilized, including full reference methods such as PEVQ (Perceptual Evaluation of Video Quality), SSIM (structural similarity) index, or no-reference methods, such as pixel based methods or parametric methods. Additionally, if there is a significant difference in quality across the chunk, the worst local quality can be weighted as being more important (or could be hidden by) the average quality across the whole segment. The target quality calculator 60 thus employs the quality metric to determine target quality for chunks in each program stream in the multiplex to provide consistent visual quality across streams.

The target profile selector 58 also employs a bandwidth calculator 62 for computing bandwidth for the program streams that correspond to the output channel. The target profile selector can thus select the target profiles for each program according to which profiles provide the highest equalized channel quality (e.g., based on profile quality data 54) for each of the program streams and provide an aggregate set of bitrates (e.g., based on profile bitrate data 56) that fit within the channel bandwidth 64. As a result, the target profile selector 58 can determine the profile for each program provided in the multiplex. The target profile selector should utilize the maximum bandwidth whenever possible.

The chunk allocator 50 also includes a profile resolver 66. The profile resolver 66 can employ a lookahead window function 68 to determine adjustments that may be required to maintain the desired quality for each of the program streams in the output channel and still fit within the channel bandwidth 64. The profile resolver 66 can employ the lookahead window function 68 to analyze a set of ABR chunks and associated profiles (e.g., based on the profile quality data 54 and profile bitrate data 56) thereof within the lookahead window. As disclosed herein, the lookahead window can be a moving window having a prescribed duration, such as an integer multiple of the average chunk size in the output channel.

The profile resolver 66 can include a quality adjuster 70 programmed to increase and/or decrease the ABR profile level for a given chunk based upon the relative quality in each respective program stream with respect to the target quality identified for such stream. As mentioned, the quality adjuster 70 can employ the lookahead window function 68 to identify a set of chunks for program streams residing within the lookahead window for analyses. The quality adjuster 70 can include a chunk boundary evaluator 72 to evaluate the aggregate bitrate of chunks at each chunk boundary within the lookahead window. For example, the chunk boundary evaluator 72 can compare the change in aggregate bitrate at each chunk boundary within the lookahead window relative to the predetermined channel bandwidth. If the chunk boundary evaluator 72 identifies an overflow (e.g., where the aggregate bitrate for streams would exceed the channel bandwidth), the quality adjuster 70 employs a profile bitrate decrease function 74.

The profile bitrate decrease function 74 can evaluate the ABR profile for each program stream starting at the identified chunk boundary providing the overflow and determine which stream's profile can be decreased one level to bring the aggregate bitrate to fit within the channel bandwidth. The decrease in profile level further can be constrained to identify the stream's profile level that will be decreased by selecting the program stream and profile that will result in the smallest difference between the resulting actual quality and the target quality that still will enable the multiplex to fit within the channel bandwidth. For example, if decreasing program A one profile level will result in a 20% decrease in quality and decreasing program B one level will result in 30% decrease in quality (assuming both changes would bring the multiplex back within the channel bandwidth), the decrease function 74 will decrease the profile for program stream A since it has the smallest effect on relative quality. This selection can be done by identifying all chunks that are contributing to overflow(s) within the lookahead window. Next the quality decrease associated with decreasing the profile one step (if available) for each chunk relative to its initial target quality can be computed. The chunk within the lookahead window with the smallest decrease in quality (for chunks capable of decreasing their profile) can be selected and its profile reduced. Then the profile resolver 66 can see if this decrease in profile level resolved all overflow conditions. If the overflow conditions are resolved by the decrease the profile resolver can move to the next chunk boundary. If the decrease in profile, however, does not resolve all the overflow conditions, the profile resolver repeats the process.

In some examples, given target chunk allocations and adjustments by the profile decrease function, there will be additional remaining bitrate between the sum of bitrates for each stream's bitrate and the channel bandwidth. The additional remaining bitrate for the output channel, which is referred to as a rate remainder for the output channel, can be determined by the profile resolver 66 based on a difference between the channel bandwidth and a sum of the rates corresponding to selected profiles for the program streams provided in the output channel.

To take advantage of the rate remainder for the output channel, the quality adjuster 70 thus can also include a profile bitrate increase function 76. The profile bitrate increase function 76 can further evaluate the chunks in the lookahead window to determine if the profile level of one or more other program streams can be incremented and still fit within the channel bandwidth 64 based on the rate remainder for the output channel. The bitrate increase function 76 thus evaluates the quality level and bitrate associated with each ABR profile that is available for the chunks of program streams within the lookahead window to identify which, if any, stream's profile can be increased and still fit within the remaining channel bandwidth. That is, the increase in bitrate resulting from the increase in profile level cannot exceed the difference between the maximum channel bandwidth and a calculated bandwidth for sending the multiplex over such channel.

As a further example, to facilitate utilization of the remaining rate $R_{rem}$ in the output channel, the profile bitrate increase function 76 determines the amount of additional bitrate needed to increment each program stream to its next higher profile level. For example, the profile bitrate increase function 76 determines if the profile level can be incremented by one level and fit in the total remaining bandwidth. The profile bitrate increase function 76 thus can repeat this process for each program stream until the remaining bandwidth in the output channel is minimized.

If more than one program stream meets the foregoing criteria, the bitrate increase function 76 can rank the program streams in order of the largest quality improvement to the lowest quality improvement over the initial target quality. The profile resolver 66 can then select the profile that will achieve the largest quality improvement as the program stream to increase its profile level. In some examples, the bitrate increase function can identify more than one stream's profile to increase based on the bitrate increase relative to the channel bandwidth. The quality adjuster 70 can store the resulting profile levels that have been identified including any original or adjusted profiles.

Additionally or alternatively, the profile resolver 66 can include a complexity analyzer 80. The complexity analyzer 80 can control profile allocation for ABR chunks in a given program stream in response to detecting changes in complexity between consecutive ABR chunks in a given program stream. For example, the complexity analyzer 80 can employ the lookahead window function 68 to evaluate the complexity of sequential chunks at respective chunk boundaries of each program stream. The complexity analyzer 80 can include a complexity calculator 82 configured to compute an indication of complexity for each of the respective chunks in each of the lookahead window. The complexity calculator 82, for example, computes complexity as a spatial visual complexity of compressed content within one or more frames. Additionally or alternatively, the complexity calculator may compute complexity based on analysis of temporal coherence of a sequence of two or more frames within respective chunks.

The complexity adjuster 80 can also include a severity calculator 84 to compute an indication of severity as the difference in complexity values between each sequential pair of chunks at chunk boundaries that reside within the lookahead window for each program stream. The severity calculator 84 thus can identify dramatic increases or decreases and picture complexity at each of the chunk boundaries within the lookahead window.

A severity analyzer 86 can analyze the computed severity values for each program stream relative to a predetermined severity threshold to ascertain a relative importance of each chunk boundary. For the example of video program streams, the severity threshold can be set to identify important or dramatic changes in picture complexity in which it is determined sufficiently important to maintain quality. An example of such an "important" event can include a scene change. The computed severity values at chunk boundaries in the lookahead window that exceed the severity threshold can be compared to each other and ranked in order of increasing or decreasing severity.

The complexity analyzer 80 can thus evaluate the computed severity to identify the chunk boundary having the greatest severity that exceeds the severity threshold. The complexity analyzer 80 can thus set (e.g., lock in) the profile of the identified chunk to a prescribed target quality level (e.g., determined by the target profile selector 58 for such chunk in the program stream). In this way, chunks at the important events can be optimally allocated and prioritized over other chunks to preserve picture quality and the profile level discriminately. Once the quality and associated bitrate for the chunk meeting the severity criteria has been set, the remaining chunks in the lookahead window can be computed by employing the quality adjuster method 70 (e.g., adjusting profiles of program streams based on quality and bitrate parameters) as disclosed herein. As mentioned, profiles for the remaining chunks within the lookahead window can be determined based on analyzing quality and bitrate data, which may include temporary reductions (or increases) in quality levels.

The profile resolver 66 thus can specify the profile for allocating a chunk at the next chunk boundary that is to be provided in the output stream. The chunk allocator 50 can continually operate and repeat the process in an iterative manner for every chunk boundary to allocate and reallocate chunk profiles for each program streams in the multiplex corresponding to the output channel. By maximizing quality and bitrate for streams in the multiplex, the chunk allocator 50 operates to mitigate the number of null packets provided in the output channel.

Figure 3:
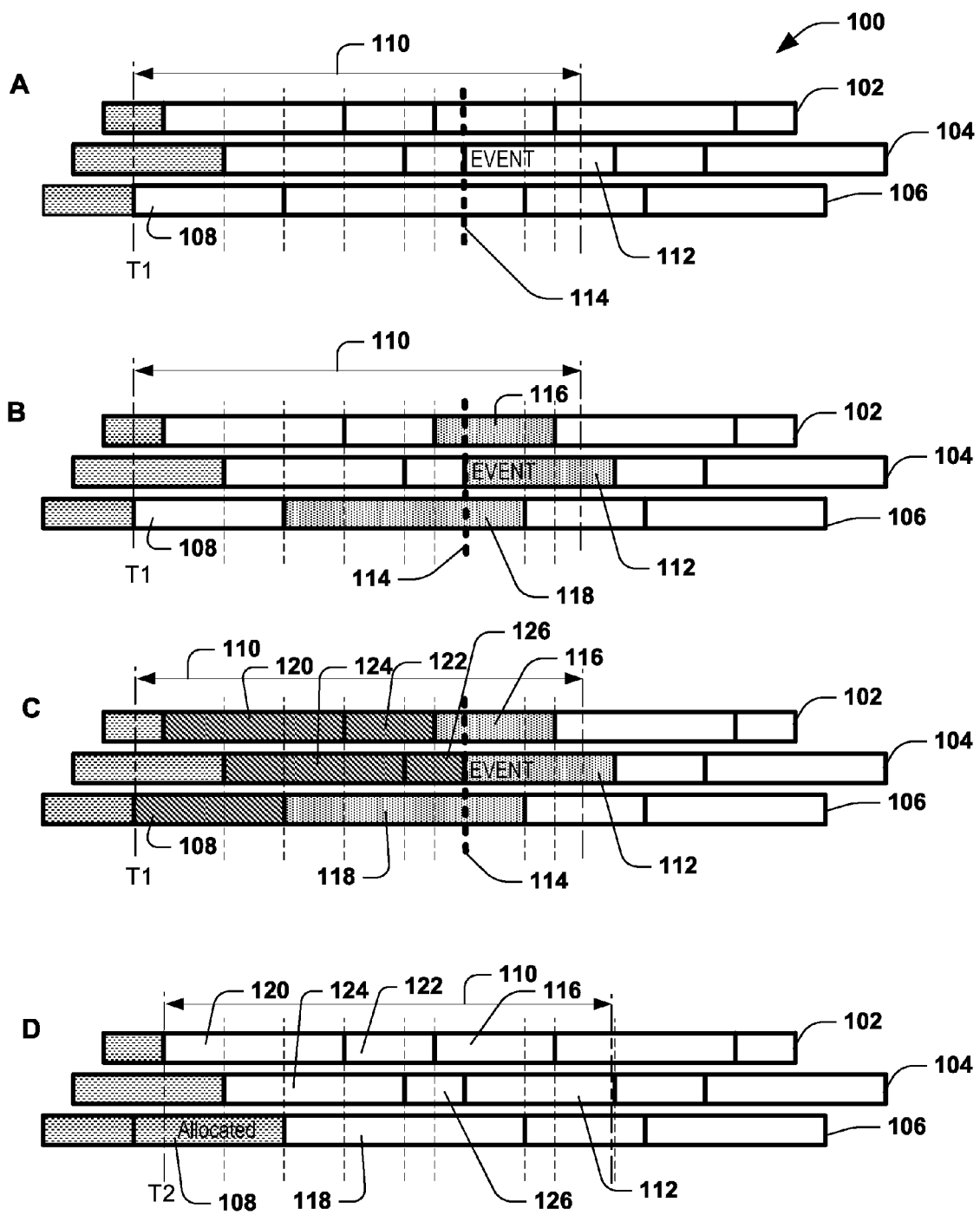
FIG. 3 depicts an example of a multiplex containing ABR streams that can be generated by a chunk allocator.

FIG. 3 depicts examples of chunks being allocated (e.g., by allocator 10 or 50) for a plurality of streams 102, 104 and 106 that are multiplexed into an output channel, such as disclosed herein. In this example, different parts of the process of chunk allocation are demonstrated in FIGS. 3A, 3B, 3C and 3D, respectively. For instance, the chunk allocation process disclosed with respect to 3A, 3B and 3C are utilized to allocate a given chunk 108 in stream 106 having a begin time (chunk boundary) at time T1. The chunk allocation process is iterative and thus is repeated for each chunk in each of the streams. The process can be a serial process for each chunk in the set of streams and/or can include two or more parallel processes for allocating chunks.

Turning to FIG. 3A, a lookahead window from the next chunk boundary at time T1 is utilized to identify which chunks are analyzed (e.g., by complexity adjuster and/or quality adjuster) for allocating the given chunk 108 in stream 106. The analysis is used to identify a chunk 112 within the lookahead window 110 corresponding to a target event 114, such as based on complexity of chunks. For example, the chunk allocator can compute complexity for each chunk within the lookahead window for the streams 102, 104 and 106, and in turn determine a change in complexity (e.g., severity) at each chunk boundary within the window that exceeds a complexity threshold. In some examples, the complexity analysis can result in no chunk boundaries within the lookahead window being identified as target events. When no target event is identified, the chunk allocator can allocate the profile for the chunk 108 based on quality and bandwidth, as disclosed herein. However, in the example of FIG. 3, it is assumed that a target event 114 is identified within the current lookahead window 110.

As demonstrated in FIG. 3B, the chunk allocator can lock in the quality for the identified chunk 112 to a target quality, as provided in one of a plurality of profiles for the stream 104. The chunk allocator can also allocate chunks 116 and 118 in the other streams 102 and 104 that overlap with the target event 114. The allocation of the profiles for the other chunks 116 and 118 during the target event 114 can be constrained by the channel bandwidth and the bitrate associated with the locked-in chunk 114. In this way, the quality of the chunk 112 can be set to ensure its quality is not reduced during the chunk allocation process.

The unallocated chunks 120, 122, 124, 126 and 108 within the lookahead window 110 are assigned tentative profiles based on target quality and refined to fit the channel bandwidth, as disclosed herein. For example, the profile resolver of the chunk allocator modifies the ABR profile level for one of the unallocated chunks 108 or 120-126 within the window 110 that will result in a smallest relative decrease in quality relative to the target quality that will enable the multiplex of streams to fit in the channel bandwidth. This results in the profile for the chunk 108 being allocated. For instance, the chunk allocator can set the profile for the chunk 108 to either an adjusted profile (e.g., reduced or increased level) or its original target profile. In some examples, as disclosed herein, the allocation process can include increasing the profile level of one or more of the unallocated chunks 108 or 120-126 (e.g., by profile increase function) within the constraints of the channel bandwidth. After the chunk 108 at the current chunk boundary T1 has been allocated, the process advances to the next chunk boundary at time T2 to allocate the chunk 120, as shown in FIG. 3D. The lookahead window thus also moves to T2 to provide a temporal range that encompasses chunks to be analyzed for the allocation process.

Figure 4:
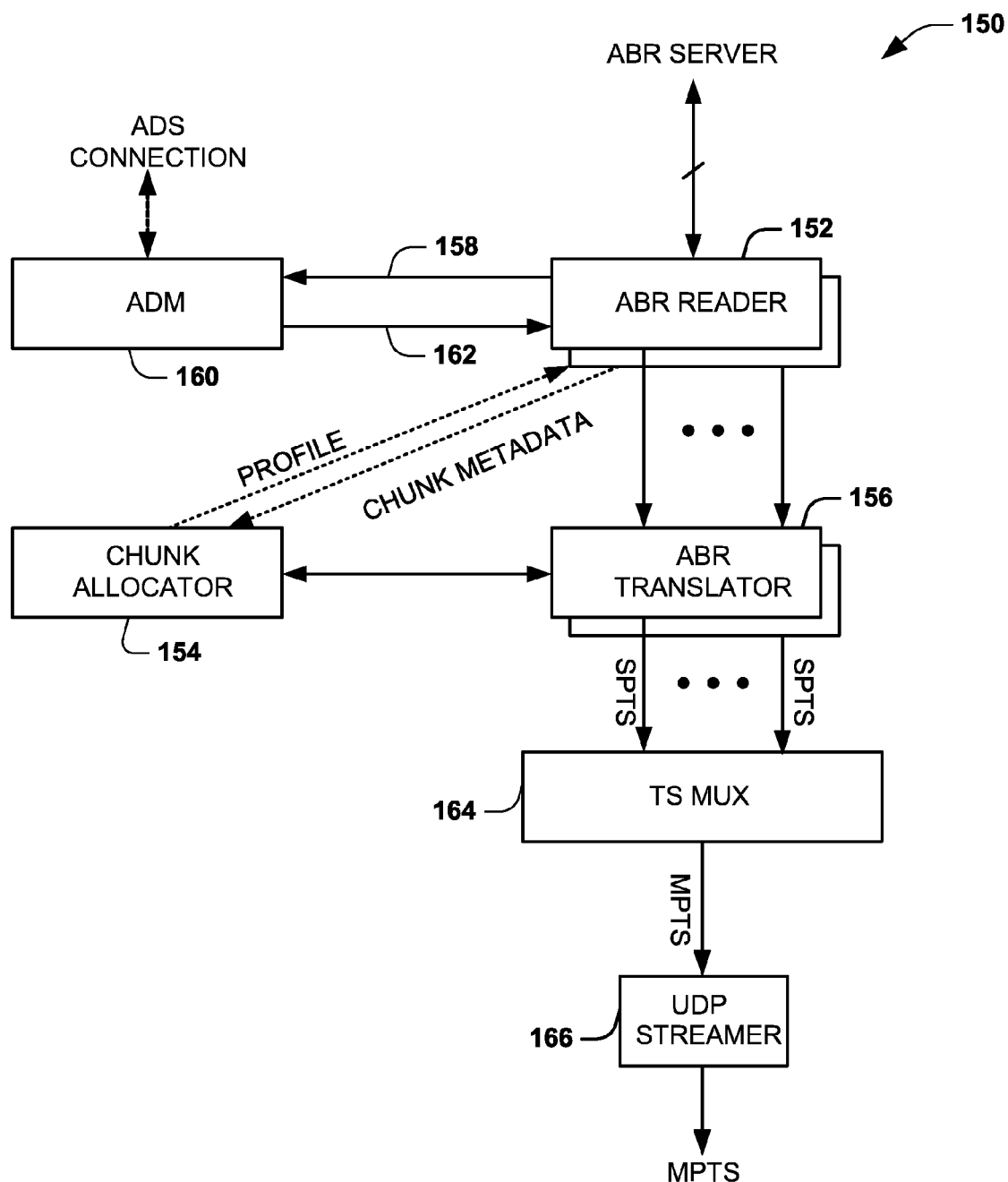
FIG. 4 is a block diagram of part of a broadcast system.

FIG. 4 depicts an example of a transmission system 150 that can be utilized for statistically multiplexing a plurality of programs, according to selected profiles, which can be aggregated to provide a multi-program transport stream (MPTS) in an output channel having a prescribed bandwidth. The system 150 includes one or more ABR readers 152 that can be connected to a content delivery network that includes ABR content. For example, the ABR content can reside at a national headend (e.g., including a plurality of channels at various ABR bitrates) as well as more local content (e.g., provided by a regional headend at one or more ABR bitrates). The ABR reader 152 can access ABR content from two or more difference sources (e.g., a main program and one or more auxiliary programs, such as ads). The encoded ABR content data thus can be accessed by the ABR reader 152 in response to profile selection information provided by a chunk allocator 154.

The chunk allocator 154 can be implemented according to any of the examples (e.g., allocators 10 or 50) disclosed herein. As mentioned, the chunk allocator 154 can select ABR profiles for one or more streams provided in the MPTS. The profile selection algorithm can be configured depending on whether each stream is constant or variable bitrate as well as whether chunk boundaries are aligned or not. For example, the chunk allocator is configured to allocate ABR profiles that the ABR reader 152 reads for each of the program streams in the output channel. As disclosed herein, the chunk allocator 154 selects the ABR profile for each program stream of the output channel to provide a substantially maximum quality equalized across streams without exceeding a predetermined maximum bandwidth of the output channel. The chunk allocator 154 selects the ABR profiles for a given next chunk by evaluating characteristics of profiles for chunks within a lookahead window from the starting chunk boundary of the given next chunk that is to be allocated. The chunk allocator 154 can identify each program stream exhibiting a change at one or more chunk boundaries (if the target profiles remain unchanged) within the lookahead window determined to cause a non-optimal bandwidth condition for the output channel. The chunk allocator 154 thus modifies a level of one of the initial target ABR profiles for a given chunk in one of the identified program streams to resolve the potential non-optimal bandwidth condition.

For example, the chunk allocator 154 can resolve the profile for the identified stream by decreasing its profile one level to result in the smallest relative decrease in actual quality relative to the target quality. Additionally, in some examples, the chunk allocator can increase the profile level of one or more other chunks within the lookahead window to further increase quality of such other chunk(s) without exceeding the output channel bandwidth. The chunk allocator further can identify "important events" at chunk boundaries (e.g., corresponding to scene changes) based on detecting a change in complexity that exceeds a complexity threshold. The chunk allocator 154 can lock in a profile level for one or more chunks at such events to ensure the quality level remains high. The chunk allocator 154 can set profiles of the other chunks within the lookahead window, constrained by the locked-in profile, until a corresponding profile is allocated for the given next chunk. The chunk allocator 154 then repeats the process to select a profile for each subsequent chunk in the set of program streams that are multiplexed into the output channel.

The system 150 can also include an ABR translator for each program, each of which can provide chunk metadata to the chunk allocator 154. For example, the ABR translator 156 can extract metadata and other information associated with each given chunk that is provided by the ABR reader 152. The chunk allocator 154 can implement the analysis based on metrics contained within or derived from the chunk metadata, such as including encoded bitrate, segment duration bitrate, time period and a quality metric associated with the given chunk or a series of chunks. The chunk allocator 154 can employ the chunk metadata for each chunk of each program to select profiles that equalize quality metrics across all of the channels and further utilize the highest quality segments that will fit into the corresponding output channel. In response to the profile selection information provided by the allocator 154, the ABR reader 152 employs the selected profile to read each chunk for each program.

Additionally, the ABR reader 152 can provide ad placement opportunity information 158 to an add management (ADM) service 160 such as programmed to employ an ad decision service (ADS), such as via a corresponding network connection. The ADM 160 can provide placement information and corresponding profile information for ADS to the ABR reader 152. For example, the ADS can include profile information that enables the ABR reader to set the corresponding ABR profile for a given ad that is to be inserted based upon the available ad placement opportunities. The ABR reader 152 thus can obtain corresponding placement data 162 for the selected profile of the ad— similar to the ABR data that is read from ABR server. For example, the ADM 160 can utilize a connection register for each active channel into which ads are to be placed. The placement availability information 158 is utilized by ADM 160 to request a placement from a corresponding ad decision service, which results in placement and profile selection information being provided by the ABR reader 152 such as corresponding to a, ABR profile for the selected ad for each respective channel into which ads are to be placed.

The ABR translator 156 is programmed to process the chunks from the ABR reader 152 to provide a corresponding streaming output demonstrated as a single program transport stream. In the system 150, there can be a plurality of ABR translators 156 each of which can provide a corresponding SPTS. A corresponding transport stream (TS) multiplexor 164 thus can receive the plurality of SPTS streams (each including multiple elementary streams) and combine the packets from the plurality of input streams to a single MPTS. The TS multiplexer 164 further can adjust STC values, as necessary, streaming them out in multi-packet bursts for corresponding transmission to a streamer 166. The streamer 166 can implement a connectionless transport layer protocol and thus provide a linear output stream according to a corresponding protocol (e.g., UDP, such as RTP via UDP). The output stream can in turn be modulated and transmitted over a corresponding network, such as a cable or other broadcast network (e.g., satellite or terrestrial) for use at downstream clients. The processing of the ABR chunks by the ABR translator, as disclosed herein, can ensure that the streams at the downstream clients remain compliant with the transport protocol (e.g., MPEG-2), namely, that the decoder buffer does not overflow as a selected program is decoded for playout on one or more corresponding devices (e.g., set top box, television, smart phone, tablet computer, desktop computer or the like).

Figure 5:
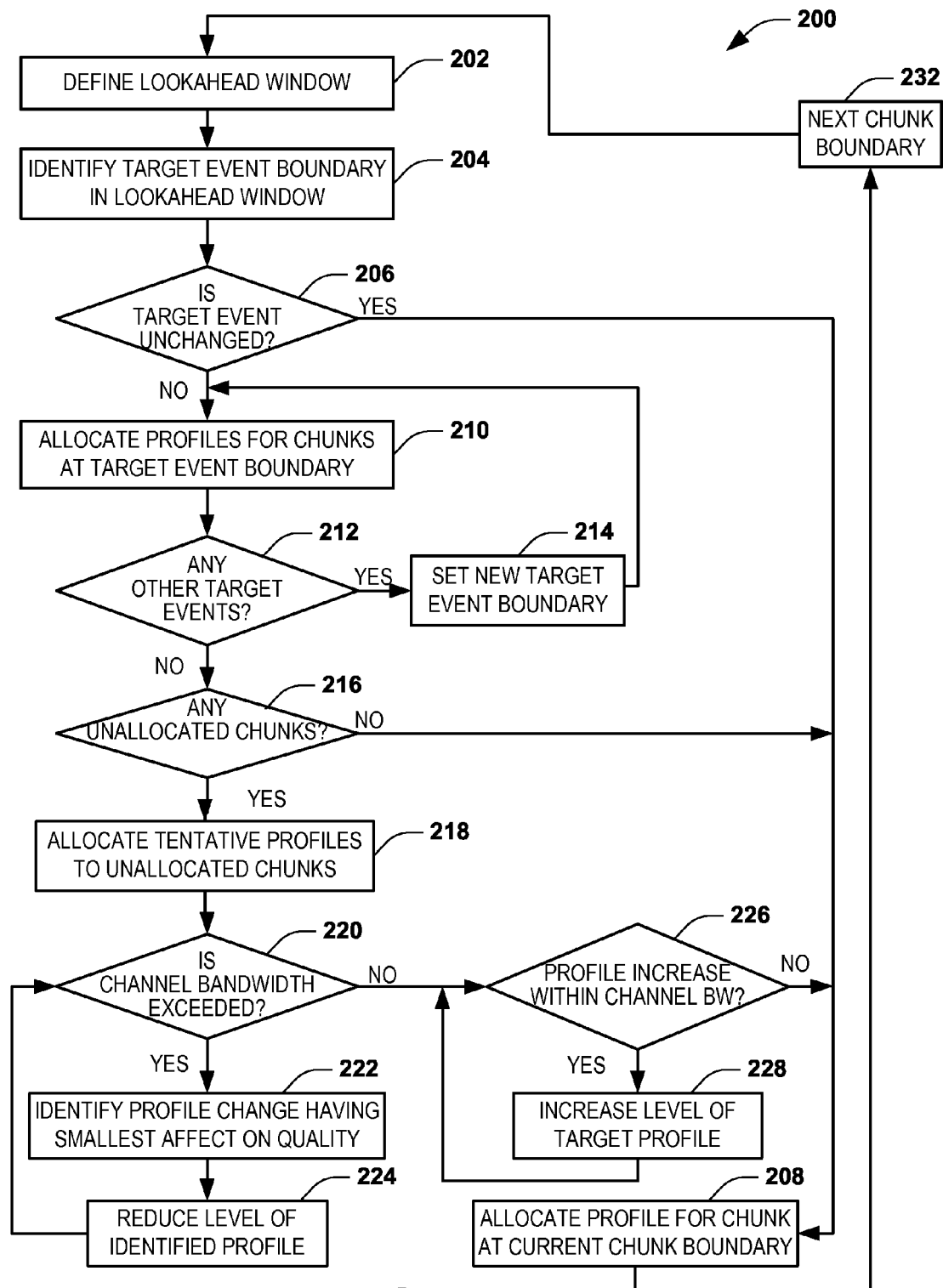
FIG. 5 is a flow diagram depicting an example of a method for allocating ABR chunks.

In view of the structural and functional features described above, certain methods will be better appreciated with reference to FIG. 5. It is to be understood and appreciated that the illustrated actions, in other embodiments, may occur in different orders or concurrently with other actions. Moreover, not all features illustrated in FIG. 5 may be required to implement a method. It is to be further understood that the following method can be implemented in hardware (e.g., one or more processors, such as in a computer, field programmable gate array (FPGA), or an application specific integrated circuit), software (e.g., stored in a computer readable medium or as executable instructions running on one or more processors), or as a combination of hardware and software.

FIG. 5 is a flow diagram depicting an example of a method 200 for allocating ABR profiles for chunks for a plurality of program streams that are provided in a multiplex, corresponding to an output channel. As disclosed herein, the output channel has a maximum channel bandwidth, which may remain fixed or vary over time. The method 200 can be implemented by a chunk allocator (e.g., allocator 10, 50 or 150, 4) as disclosed herein. The method 200 employs profile metadata that is provided for ABR chunks in each of the plurality of program streams. As mentioned, the profile metadata can be provided by an ABR reader or other mechanism within the transmission system. As disclosed herein, profile metadata can include values for profile quality, bit rate for each of a plurality of chunks for each of a plurality of different profiles for chunks that can be concatenated to provide a corresponding stream of media or data.

At 202, the method includes defining a lookahead window. The lookahead window is defined with respect to a current time, corresponding to the chunk boundary for the next chunk that is to be allocated. The lookahead window can extend a duration that includes plurality of average or maximum chunk lengths from the current chunk boundary.

As disclosed herein, the lookahead window provides a time interval during which the allocation method can search and analyze ABR profiles for the chunks in the multiplex.

At 204, the target event boundary is identified within the lookahead window. The target event boundary can correspond to an important event, such as disclosed herein. The target event can correspond to significant change in quality and/or complexity between sequential chunks of a given program stream for a chunk boundary that resides within the lookahead window. The relative importance can be ascertained based on analysis (e.g., by lookahead window analyzer 16, chunk boundary evaluator 72, and/or complexity analyzer 80) of profile metadata for respective pairs of chunks at chunk boundaries within the lookahead window. The analysis can determine the occurrence of target event by comparing the change in quality and/or complexity relative to a corresponding threshold.

At 206, a determination is made as to whether the identified target event boundary has not changed since the last iteration of the method 200. If the target event boundary is unchanged, the chunks preceding the target event have already been allocated in the one or more proceeding iterations of the method 200. Thus, the method can proceed from 206 to 208 in which the profile for the chunk beginning at the current chunk boundary can be allocated and locked in for such chunk. In response to determining that the target event has changed at 206, the method proceeds to 210.

At 210, profiles for chunks at the target event boundary (identified at 204) are allocated. The allocation at 210 can be implemented (e.g., by target profile selector 14 or 58) based on an evaluation of quality of the available profiles for each program stream and the channel bandwidth. The allocation at 210 operates to select and lock-in the profile for the chunk beginning at the target event boundary to ensure a sufficient quality level (e.g., corresponding to a target quality level is maintained). The other chunks overlapping the target event boundary area also allocated at 210, by selecting profiles for such chunks that provide a maximum equalized quality level across the program streams without exceeding the channel bandwidth. The profile level of such chunks at or overlapping with the target event boundary in one or more of the program streams may also be increased provided that remaining channel bandwidth exists. The increase can be implemented according to which program stream would result in the largest increase in quality relative to its selected target quality.

At 212, a determination is made as to whether any other target events exist within the lookahead window. The determination at 212 can be made according to the same approach used to identify the target event boundary at 204. For example, the other target event can be identified by evaluating complexity (e.g., by complexity analyzer 80), such as by determining if the change in complexity at such other chunk boundary exceeds a corresponding complexity threshold. In response to detecting another target event within the lookahead window at 212, at 214, a new target event is set for further processing. Thus, from 214 the method can return to 210 for another iteration of the allocation process for selecting profiles for each of the chunks at the new target event boundary detected at 212. In this way, each of the target events that are determined to be sufficiently important can be identified and the quality of levels for chunks beginning at the target event chunk boundaries can be forced to a desired quality level. In some cases, such allocation of profiles for chunks at target events ensures the quality of chunks at each target event by locking in a desired quality level profile, even if temporarily decreasing the quality of other chunks to accommodate locking in the quality at one or more target events.

At 212, if no additional target events exist within the lookahead window, the method can proceed to 216. At 216, a determination is made as to whether any chunks within the lookahead window remain unallocated. If no chunks remain unallocated, the method can proceed from 216 to 208 for allocating the profile for the chunk beginning at the current chunk boundary. If additional unallocated chunks exist within the lookahead window, the method can proceed to 218. The unallocated chunks generally correspond to chunks that are not at target events (e.g., chunks 120 and 122 in stream 102 of FIG. 3). At 218, tentative target profiles for the unallocated chunks can be allocated. The allocation of tentative profiles at 208 can be implemented (e.g., by target profile selector 58) based on available profiles for each stream that have been determined to provide substantially equalized quality levels for each of the chunks. As disclosed herein, such tentative profile allocations for each perspective program stream could exceed or provide additional remaining bandwidth in the output channel into which the program streams are transmitted.

At 220, a determination is made as to whether the channel bandwidth is exceeded at one or more chunk boundaries based upon the sum of bitrates at each boundary due to the allocations at 218 as well as 210. If the channel bandwidth is exceeded at 220, the method can proceed to 222 for implementing a profile decrease function (e.g., profile decrease function 74 of FIG. 2). At 222, the profile change that has a smallest effect on quality relative to the initial target quality is identified. This can be performed by sorting the chunks, which have been allocated tentative profiles, in an order from least to most important (e.g., from the smallest change in quality to the greatest change in quality) in response to reducing the profile level for each program stream at the given chunk boundary. At 224, the level of the identified profile can be reduced with the smallest impact on quality for the aggregate set of program streams in the output channel.

From 224 the method returns to 220 to determine if the channel bandwidth is exceeded. At 220, if the channel bandwidth is still exceeded the profile decrease function can be repeated one or more times by decreasing the profile level of another chunk in the output channel having the next smallest impact on quality. As disclosed herein, for example, the impact in quality can be determined based on computing a difference between the quality metrics for the current tentative profile and the next lower profile level for each of the chunks being allocated at 218 (e.g., not corresponding to the target event). The method can loop at 220, 222 and 224 until the channel bandwidth is no longer exceeded.

Once the channel bandwidth is not exceeded, the method proceeds to 226 to implement a profile increase function (profile increase function 76 of FIG. 2). For instance, at 226, a determination is made as to whether the profile for any chunk in the set of program streams being allocated within the lookahead window can be increased one level without exceeding the total channel bandwidth. The determination at 226 can be made by sorting the program streams based on computing a relative change in quality level relative to the initial target quality resulting from an increase in quality that will not result in the channel bandwidth being exceeded. If the profile level for one or more program streams can be increased at 226, the method proceeds to 228. At 228, the level at the profile of a given chunk (either allocated at 210 or 218, or as decreased at 224) is increased. The given chunk can be selected according to which chunk within the lookahead window will experience the largest increase in relative quality without resulting in exceeding the channel bandwidth.

From 228 the profile increase function returns to 226 to determine if the profile level of one or more chunks can be increased without exceeding the channel bandwidth. The profile increase function (at 226 and 228) can repeat until the gap between the actual allocated bit rates and the channel bandwidth has been minimized. In some examples, the same chunk may experience multiple profile level increases. Typically, however, the profile level one or more different chunks will be increased via the profile increase function. Once it is determined at 226 that no additional profile increase can be made for chunks within the lookahead window (due to insufficient remaining channel bandwidth), the method proceeds from 226 to 208 in which the profile for the chunk at the current chunk boundary is allocated. For instance, the profile allocated for the current chunk boundary can be provided to an ABR reader (e.g., reader 152). From 208, the method proceeds to 232 in which the process advances to the next chunk boundary for allocating the profile for such chunk. The method then returns to 202 to repeat the chunk allocation method 200 for the lookahead window, which is moved according to the next chunk boundary at 232.

As will be appreciated by those skilled in the art, portions of the systems and methods disclosed herein may be embodied as a method, data processing system, or computer program product (e.g., a non-transitory computer readable medium having instructions executable by a processor or other hardware, such as an FPGA). Accordingly, these portions of the present invention may take the form of an entirely hardware embodiment, an entirely software embodiment, or an embodiment combining software and hardware. Furthermore, portions of the invention may be a computer program product on one or more computer-usable storage media having computer readable program code on the media. Any suitable computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What are disclosed herein are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   determining a target adaptive bitrate (ABR) profile for each of a plurality of program streams of an output channel to achieve a substantially equalized target quality for the program streams that fit within a bandwidth of the output channel;
   identifying changes at each chunk boundary within a lookahead window that is determined to cause a predefined bandwidth condition for the output channel, the lookahead window extending an interval from a current chunk boundary corresponding to a chunk that is to be allocated at the current chunk boundary;
   modifying a level of the target ABR profile for one or more given chunks of at least one of the program streams to resolve the bandwidth condition with a smallest relative decrease in quality or largest relative increase in quality relative to a target quality for each given chunk; and
   selecting an ABR profile for the chunk that is to be allocated at the current chunk boundary based on the modifying and not exceeding the bandwidth of the output channel.

2. The method of claim 1, wherein the ABR profiles associated with each program stream include profile metadata specifying at least a bitrate and a quality for each ABR profile, and
   wherein determining the target ABR profile further comprises:
   analyzing the quality and bitrate associated with each program stream to identify the target quality for each program stream that provides a maximum substantially equalized quality and sum of bitrates for the program streams do not exceed the bandwidth of the output channel; and
   selecting the target ABR profile having the target quality identified for each program stream.

3. The method of claim 1, wherein the lookahead window has a duration from the current chunk boundary that is a multiple of an average chunk length.

4. The method of claim 1, wherein the bandwidth condition for the output channel is an overflow condition that exceeds the bandwidth of the output channel resulting from the identified change, and
   wherein modifying further comprises reducing the level of an ABR profile for the one or more given chunks in a program stream determined to have the smallest resulting decrease in quality relative to other chunks within the lookahead window and is within the bandwidth of the output channel.

5. The method of claim 4, wherein the modifying further comprises increasing the level of an ABR profile for one or more other chunks of the program streams determined to have the largest relative increase in quality for each such other chunk with the program streams fitting in the bandwidth of the output channel.

6. The method of claim 1, further comprising:
   identifying a target event boundary within the look ahead window of a respective stream of the plurality of program streams; and
   allocating an ABR profile for a corresponding chunk in the respective stream at the target event boundary to provide at least a minimum target quality level in response to the identified target event boundary.

7. The method of claim 6, wherein the identifying further comprises:
   computing a change in complexity between adjacent chunks at chunk boundaries within the lookahead window; and
   determining which of the chunk boundaries has a greatest change in complexity.

8. The method of claim 7, wherein the computed change in chunk complexity corresponds to an increase or decrease in chunk complexity between the adjacent chunks of the respective stream with respect to the chunk boundaries residing in the lookahead window.

9. The method of claim 7, further comprising:
   calculating a severity to represent the change in complexity between the adjacent chunks at the chunk boundaries within the lookahead window;
   comparing the severity calculated for each of the chunk boundaries within the lookahead window; and
   wherein the corresponding chunk is selected according to which of the chunk boundaries has the greatest severity based on the comparison and exceeds a severity threshold.

10. The method of claim 6, wherein the allocating further comprises allocating ABR profiles for chunks in each of the program streams that begin at or overlap with the target event boundary to ensure minimum target quality level for at least the corresponding chunk and that the chunks fit within the bandwidth of the output channel.

11. The method of claim 10, further comprising allocating ABR profiles for unallocated chunks within the lookahead window by allocating a tentative ABR profile for each of the unallocated chunks and adjusting the tentative ABR profiles for each of the unallocated chunks to fit within the bandwidth of the output channel.

12. The method of claim 1, further comprising:
   reading chunks of ABR content for each of the plurality of program streams according to the selected ABR profile for each given chunk to provide a single program transport stream for each of the plurality of program streams; and
   multiplexing each single program transport stream to provide a multiple program transport stream corresponding to the output channel.

13. A system, comprising:
   at least one of a processor or a field programmable gate array configured to execute instructions stored in memory, the instructions comprising:
   a chunk allocator that allocates adaptive bitrate (ABR) profiles for reading a plurality of program streams that are multiplexed into an output channel having a channel bandwidth, the chunk allocator comprising:
   a lookahead window analyzer that analyzes profile metadata for each of the program streams within a lookahead window from a current chunk boundary to identify at least one target event at a chunk boundary within the lookahead window; and a profile resolver that, in response to each target event, allocates ABR profiles for chunks at the target event chunk boundary to fit within the channel bandwidth and achieve a substantially optimal quality level for the chunks at the target event chunk boundary, the profile resolver further allocates the ABR profiles for each of the unallocated chunks within the lookahead window by adjusting the ABR profiles for each of the unallocated chunks to fit within the predetermined bandwidth constrained by the ABR profiles allocated for the chunks at the target event chunk boundary, the chunk allocator selects an ABR profile for a given chunk that is to be allocated at the current chunk boundary based on the adjusting.

14. The system of claim 13, wherein the instructions further comprise a target profile selector that determines a target profile level for each of the plurality of streams by substantially equalizing the quality level across the program streams and fit within the predetermined bandwidth of the output channel in which the program streams are multiplexed.

15. The system of claim 13, wherein the profile resolver further comprises a complexity analyzer that computes a complexity value for each of the chunks of the program streams within the lookahead window and determines a change in the complexity value for each chunk boundary within the lookahead window, the profile resolver evaluating the change in complexity at each chunk boundary to identify the least one target event chunk boundary.

16. The system of claim 13, wherein the profile resolver further comprises a quality adjustor that evaluates an aggregate bitrate of chunks at each chunk boundary within the lookahead window to determine if changes at each chunk boundary within the lookahead window, as constrained by the ABR profiles allocated for the chunks at the target event chunk boundary, would exceed the predetermined bandwidth, and wherein the profile resolver adjusts the ABR profiles of the unallocated chunks based on the evaluation.

17. The system of claim 16, wherein the quality adjustor further comprises:

a profile decrease function that reduces a level of an ABR profile for the one or more of the unallocated chunks in a program stream determined to have a smallest resulting decrease in quality level relative to other of the chunks within the lookahead window; and a profile increase function that increases the level of an ABR profile for one or more other unallocated chunks of the program streams to increase quality for each such other chunk determined to have a largest resulting increase in quality that will fit within the predetermined bandwidth.

18. The system of claim 13, further comprising:

an ABR reader that reads chunks of ABR content from a content resource for each of the plurality of program streams according to the selected ABR profile for each of the chunks to provide a stream of ABR chunks for each of the plurality of program streams;

an ABR translator that converts each stream of ABR chunks a single program transport stream for each of the plurality of program streams; and a multiplexer multiplexing each single program transport stream to provide a multiple program transport stream corresponding to the output channel.

19. A method comprising:

analyzing profile metadata for each of a plurality of adaptive bitrate (ABR) program streams within a lookahead window from a current chunk boundary to identify at least one target event at a chunk boundary within the lookahead window;

allocating ABR profiles for chunks at the target event chunk boundary to fit within a channel bandwidth and achieve a predetermined target quality level for the chunks at the target event chunk boundary;

in response to each target event, selecting ABR profiles for each of the unallocated chunks within the lookahead window by adjusting the ABR profiles for each of the unallocated chunks to fit within the channel bandwidth constrained by the ABR profiles allocated for the chunks at the target event chunk boundary; and allocating an ABR profile for a given chunk that is to be allocated at the current chunk boundary based on the selected ABR profiles.

20. The method of claim 19, further comprising repeating the analyzing and each allocating to select a respective ABR profile for each chunk boundary in the plurality of ABR program streams.

* * * * *